United States Patent [19]

Thaler et al.

[11] 3,995,072

[45] Nov. 30, 1976

[54] SUGAR EXTENDER

[76] Inventors: Edward Thaler; Selma L. Thaler, both of 15 Highland Ave., Middletown, N.Y. 10940; Arthur Thaler, 299 Church St., Poughkeepsie, N.Y. 12601

[22] Filed: Sept. 26, 1975

[21] Appl. No.: 617,160

Related U.S. Application Data

[63] Continuation-in-part of Ser. No. 553,164, Feb. 26, 1975, abandoned, and Ser. No. 549,749, Feb. 13, 1975, abandoned, said Ser. No. 553,164, is a continuation-in-part of said Ser. No. 549,749.

[52] U.S. Cl. ............................ 426/653; 426/531; 426/658
[51] Int. Cl.² ..................... A21D 1/00; A21D 13/00
[58] Field of Search ............ 426/598, 658, 653, 531

[56] References Cited

UNITED STATES PATENTS

| 3,433,644 | 3/1969 | Ganske et al. | 426/548 |
|---|---|---|---|
| 3,476,571 | 11/1969 | Block et al. | 426/548 |
| 3,667,969 | 6/1972 | Krocauer | 426/548 |
| 3,684,529 | 8/1972 | Liggett et al. | 426/548 |
| 3,798,204 | 3/1974 | Nakajuma | 426/548 |

*Primary Examiner*—Raymond N. Jones
*Attorney, Agent, or Firm*—Cushman, Darby & Cushman

[57] ABSTRACT

A composition containing water, propylene glycol and salt has been discovered which when added to sugar extends the effect of the sweetening capacity of sugar by about ten percent.

11 Claims, No Drawings

SUGAR EXTENDER

CROSS REFERENCE TO RELATED APPLICATIONS

This application is a continuation-in-part of Ser. No. 549,749, filed Feb. 13, 1975. The application filed this date is also a continuation-in-part application of Ser. No. 553,164, filed Feb. 26, 1975 (which in turn is a continuation-in-part of Ser. No. 549,749, filed Feb. 13, 1975), both now abandoned.

The invention is directed to a sugar sweetness extender.

In particular, the invention is directed to a composition, the method for forming the composition and use of the composition to extend the effectiveness of sugar as a sweetener by at least ten percent.

The sugar sweetener extender is attractive commercially for its feature of allowing the reduction of sugar used in any composition. As set forth below, the reduction in the amount of sugar used in any application is at least ten percent, and sometimes as much as 25 percent, by virtue of use of the sugar sweetener extender composition of the invention in combination with sugar.

SUMMARY OF THE INVENTION

In accordance with the invention, a composition has been discovered which may be used in combination with an amount of sugar, i.e., sucrose, to extend the sweetness effect of sugar by at least ten percent. Alternatively, addition of the composition of the invention to a sugar-containing composition provides for the reduction of the required amount of sugar by at least ten percent. The sugar sweetener extender of the composition comprises water, propylene glycol and salt (sodium chloride). Other component additives may be added to the base water-propylene glycol-salt composition, including lactic acid, citric acid, phosphoric acid, tartaric acid, sodium lactate or mixtures thereof. The composition can consist essentially of water, sodium chloride, propylene glycol, citric acid, lactic acid, phosphoric acid and tartaric acid and sodium lactate.

DETAILED DESCRIPTION OF THE INVENTION

The prior art has recognized sugar substitutes, such as the cyclamates and saccharin. The sugar sweetener extender of the invention differs from these prior art sugar substitutes in that the composition of the invention is to be used in combination with sugar. The sugar sweetener extender composition of the invention comprises basically water, propylene glycol and salt. Preferably, the basic composition contains in addition to water, propylene glycol and salt, lactic acid, citric acid phosphoric acid, tartaric acid and mixtures thereof. It is to be understood that lactic acid and sodium lactate may be used interchangeably. Particularly, sodium lactate may be substituted in part or in whole for lactic acid.

Obviously, the compositions of the invention may be used in various ways. They may be used in combination with sugar to complete the sugar requirement in bakery products, carbonated and uncarbonated sodas, or they may be used alone with reduced amounts of sugar to satisfy sugar requirements.

Obviously, these compositions containing sugar in less than the usual amounts may be used alone for additives to coffee, teas, to fruits and the like. When used as one component in a composition, the sugar extended compositions may be used in combination with condiments, flour, flavorings, in preserves, ice cream, wines, mayonnaise, and the like.

The compositions of the invention contain water, propylene glycol and salt (sodium chloride). These components may be present in the ultimate composition in the following relative proportions: 2.5 – 5 gallons of water; 0.75 – 3 gallons of propylene glycol; and 3 to 7.5 pounds of sodium chloride. When preferably the base composition contains citric acid, phosphoric acid, tartaric acid and lactic acid, as well as the water-propylene glycol-sodium chloride base composition, citric acid may be present in amounts of 2 to 6 ounces; phosphoric acid may be present in amounts of 2 to 6 ounces; the tartaric acid may be present in amounts of 2 to 6 ounces; and the lactic acid (and/or sodium lactate) may be present in amounts of 0.9 to 6 ounces. The total amount of said aforementioned acids (and/or sodium lactate) can range between 3 to 24 ounces in the above-described water, propylene glycol and salt composition. Citric acid, phosphoric acid, tartaric acid or lactic acid may be added to the base composition as the sole additive to the base composition in amounts of three to twenty ounces. Preferably, when only one additive is added to the water-propylene glycol-salt composition, to form the extender, said one additive is present in amounts of 6 to 24 ounces. The composition of the invention is prepared by boiling the water component of the sugar sweetener, and then mixing the remaining components with the boiling water with stirring. The mixture is allowed to cool. Stirring action of the mixture is maintained during the cooling process. The cooled mixture may then be filtered. The mixture is then ready for admixture with sugar or a composition containing sugar.

Such a composition allows a 10 to 25 percent sugar reduction in any sugar requirement.

The invention will be more fully understood by the example and organoleptic tests set forth below.

EXAMPLE

Four gallons of water were brought to the boiling point in a container equipped with a stirrer. After the water had been heated to 212° F. (boiling) four ounces of citric acid (hydrous-U.S.P. granular form) were added and dissolved in the water. Thereafter, four ounces of phosphoric acid (U.S.P.), and six pounds of sodium chloride and 2 gallons of propylene glycol (U.S.P.) were added consecutively. Next, four ounces of tartaric acid were added to the boiling solution. Finally, four ounces of lactic acid were added to the boiling water. The boiling water was stirred continuously during the addition of the six ingredients. After complete addition and dissolution of the components, the mixture was allowed to cool while constantly stirred. After the mixture had been cooled, the mixture was funneled through filter paper into a 5 gallon container. The resulting composition is referred to as the "extender" in the following organoleptic tests. The liquid mixture which was so prepared was tasted. The liquid did not have a distinct flavor or taste, but left a slightly bitter taste or slight stinging sensation on the tongue.

The order in which the components are added to make the mixture has no effect on the resulting sugar sweetness extender.

Certain organoleptic testing was undertaken. Generally, 0.75 – 1.25 pints of the sugar sweetener extender of the invention was used in conjunction with a simple sugar water-syrup. The extended sugar composition is prepared simply by dissolving the sugar in the sugar extender composition. In particular, 0.75 – 1.25 pints of sugar sweetener extender compositions of the invention were mixed with 500 – 950 gallons of simple sugar-water syrups.

In the organoleptic testing set forth below, the amount of sugar sweetener extender of the invention was used in a ratio of one pint of extender to 750 gallons of water containing sugar.

ORGANOLEPTIC TEST A

Persons acting as taste testers were given samples A, B and C in Test A. Samples A, B and C are described below:

| SAMPLES | COMPOSITION |
| --- | --- |
| A | 6 lb. sugar/gal. of $H_2O$ |
| B | 5.4 lb. sugar/gal. of $H_2O$ |
| C | extender* + 5.4 lb.sugar/gal. of $H_2O$ |

*The extender was added in ratio of 1 pint of extender to 750 gal. of sugar-water solution.

In 100% of the tasters tested, Sample A (the standard) was indistinguishable from C. On the other hand, all taste testers recognized the decreased sweetness of Sample B. Thus, the sugar sweetness extender of the invention can successfully result in a 10% reduction of any given sugar requirement.

TEST B

The objective of Test B was to determine whether the sugar sweetness extender of the invention could successfully result in a 25% reduction of a given sugar requirement. Persons, acting as taste testers, were given Samples A, B' and C'.

Samples A, B' and C' are described below:

| SAMPLES | COMPOSITION |
| --- | --- |
| A | 6 lb.sugar/gal. of $H_2O$ |
| B' | 4.5 lb. sugar/gal. of $H_2O$ |
| C' | extender* + 4.5 lb. sugar/gal. of $H_2O$ |

*The extender was added in a ratio of 1 pint of extender to 750 gal. of the simple sugar-water syrup-solution.

Sample B' represented a 25% reduction in sugar as compared to the standard (6 lbs. of sugar per gallon of water). Approximately 50% of the group of taste testers could not distinguish between the standard A and the Sample C'. It was also noted that if flavoring, particularly chocolate was added to Samples A, B' and C', more than 50% of the taste testers could not distinguish between the standard A and the Sample C'.

All taste testers could discern that Sample B was less sweet than either of the Standard A or the Sample C. Moreover, all taste testers could discern the lack of sweetness of Sample B' as compared to either the Standard A or the Sample C'.

In the testing the possibility of 25% reduction of a given sugar requirement, it was noted that flavoring in combination with the sugar sweetness extender of the invention could assist in increasing the percent reduction of a sugar requirement. Thus, in Test B when chocolate flavoring was added to Standard A and to Samples B' and C', more than 50% of the taste testers could not distinguish between Samples C' and A. The sugar used in these tests was table sugar (sucrose).

The order of the addition of components of the sugar sweetness extender to the boiling water had no effect on the capabilities of the resulting composition as a sugar sweetness extender.

The extender used in the above organoleptic tests comprised a base composition (propylene glycol-water-salt) and a mixture of four acids. When combined with sugar as an extender this composition did not impart an "after taste" to the combination.

In arriving at the extender set forth above various combinations of the ingredients were tested. For instance, a composition comprising only propylene glycol-water-salt (NaCl) was added to sugar, or a sugar-water syrup. The propylene glycol-water-salt solution did indeed extend a given sugar requirement by about 10%. However, use of this composition as an extender imparted a salty taste to the "extended" sugar composition. The salty taste of the extended sugar solution interfered with the organoleptic test results.

One of the acids (any of tartaric, citric, phosphoric and lactic acids) was then added to a propylene glycol-water-salt solution. It was noted that combination of one acid with the propylene glycol-water-salt solution did extend a given sugar composition, by about 10%. It was noted that the inclusion of one acid resulted in a less salty sugar composition, than when the base composition (propylene glycol-water-salt) was used as an extender.

Inclusion of more than one and less than four acids in admixture with propylene glycol-water-salt solutions produced extenders within the scope of the invention. When used in combination with sugar, these extenders acted to extend a given sugar requirement by about 10%. Inclusion of more than one acid in the base composition resulted in sugar extended compositions which were less salty than extenders of the base composition in combination with only one of the aforementioned acids.

The acid components of extenders of the invention appear to act as masking agents. Depending on the exact nature of the sugar composition to be extended, the acids may or may not be necessary. It is difficult to determine at this time, whether the effect of the addition of acids to the base to eliminate saltiness is synergistic or merely a cumulative effect of doubling, tripling or quadrupling the weight of the acid component of the extender.

Particularly, the sugar extender of the example (4 acids) does not impart a salty flavor to a sugar-water solution. Use of only 3 acids (each in amounts of 3–5 ounces) imparts a salty flavor to the sugar solution. Use of only 1 acid (3–5 ounces) in the extender results in a saltier sugar solution than when the extender contains 2 acids (each in amounts of 3–5 ounces), while use of only 1 acid results in a less salty sugar solution than an extender of the invention exclusive of any of the acid components.

The testing of the extenders of the invention with respect to the number of acids to be included was undertaken using simple sugar water solutions. It is possible, as set forth in Test B above, that inclusion of flavorants in the simple sugar solutions would have eliminated the saltiness and increased the sugar extender capacities of extenders of the invention containing less than four acids.

In our copending application Ser. No. 549,749, it was stated that the extender composition may be used with various sugars. It was also indicated that the extender composition could not be used with invert sugar, which is a 50—50 mixture of fructose and glucose (resulting from the hydrolysis of the disaccharide sucrose). It was believed that the extender composition could not be used with invert sugar on the basis of a theory of the invention which was proposed to rationalize the effects of the extender composition. However, we no longer believe that our original theory of the invention is necessarily valid. Thus, we can see no reason why the extender composition of our invention could not be used with invert sugar to extend invert sugar. The extender composition may be used with sucrose, lactose, fructose, maltose, and dextrose. By this enumeration of sugars, we mean to include mixtures of those aforementioned sugars, naturally occurring and commercial sources of those sugars which may contain other components, e.g. corn syrup and corn sugar.

The extender of the invention is characterized by the advantage that it provides a fast inexpensive means or alternative to the art for extending sugar. Prior art methods of extending sucrose are very high temperature processes, which may require conversion of sucrose in the presence of acid or are enzyme reactions which require lengthy reaction times and produce the extended sugar. By comparison, once the extender composition of the invention has been prepared, the extender need only be mixed with the sugar that is to be extended.

Thus, in accordance with the invention, a sugar sweetness extender has been provided, as set forth in the embodiments above. The embodiments set forth herein are not to be taken as limiting, but are meant to include all equivalents and obvious modifications of each element of the invention.

What is claimed is:

1. A sugar extender composition to be utilized with sugar and consisting essentially of water, propylene glycol and salt, wherein the relative proportions of said components are 2.5 to 5 gallons of water; 3 to 7.5 pounds of sodium chloride, and 0.75 to 3 gallons of propylene glycol, whereby said composition when utilized in an effective amount permits the reduction in the amount of sugar used in a given sugar requirement by at least about 10%.

2. A sugar extender composition to be utilized with sugar and consisting essentially of (1) water, (2) propylene glycol, (3) salt, wherein the relative proportions of said components are 2.5 to 5 gallons of water; 3 to 7.5 pounds of sodium chloride, and 0.75 to 3 gallons of propylene glycol and (4) at least one additive, said additive being citric acid, lactic acid, phosphoric acid, tartaric acid, sodium lactate, or mixtures thereof, and being present in amounts of 3 to 24 ounces whereby said composition when utilized in an effective amount permits the reduction in the amount of sugar used in a given sugar requirement by at least about 10%.

3. The sugar extender of claim 2, wherein said additive is a mixture, said mixture comprising 0.9 to 6 ounces of citric acid, 0.9 to 6 ounces lactic acid, 0.9 to 6 ounces phosphoric acid and 3 to 5 ounces of tartaric acid.

4. A composition comprising the combination of sugar and a sugar extender composition to be utilized with sugar and consisting essentially of water, propylene glycol and salt, wherein the relative proportions of said components are 2.5 to 5 gallons of water; 3 to 7.5 pounds of sodium chloride, and 0.75 to 3 gallons of propylene glycol and characterized by at least about a sweetness level the same as that of a sugar solution and 10% more sugar than said composition.

5. A composition comprising the combination of sugar and a sugar extender composition to be utilized with sugar and consisting essentially of (1) water, (2) propylene glycol, (3) salt, wherein the relative proportions of said components are 2.5 to 5 gallons of water; 3 to 7.5 pounds of sodium chloride, and 0.75 to 3 gallons of propylene glycol, and (4) at least one additive, said additive being citric acid, lactic acid, phosphoric acid, tartaric acid, sodium lactate, or mixtures thereof, said additive being present in the sugar extender in an amount of 3 to 24 ounces, and characterized by a sweetness level the same as that of a sugar solution containing at least about 10% more sugar than said combination.

6. A composition comprising the combination of sugar (1) water, (2) propylene glycol, (3) salt, wherein the relative proportions of said components are 2.5 to 5 gallons of water; 3 to 7.5 pounds of sodium chloride, and 0.75 to 3 gallons of propylene glycol, and (4) a mixture of additives comprising 0.9 to 6 ounces of citric acid, 0.9 to 6 ounces of lactic acid, 0.9 to 6 ounces of phosphoric acid, and 3 to 5 ounces of tartaric acid and characterized by a sweetness level the same as that of a sugar solution containing at least about 10% more sugar than said combination.

7. A process of forming the sugar extender of claim 1, comprising boiling said water and adding thereto said propylene glycol and sodium chloride, with stirring while said sugar extender composition is cooling.

8. The process of claim 7, including adding an additive to the boiling water, said additive being lactic acid, tartaric acid, phosphoric acid, citric acid or a mixture thereof, said additive being present in amounts of 3 to 24 ounces, based on the composition of water, propylene glycol and sodium chloride.

9. A process of extending sugar comprising providing the composition of claim 1 and adding said composition to sugar to produce a mixture, said mixture characterized by a sweetness level of a sugar solution containing 10% more sugar than said mixture.

10. A process of extending sugar comprising providing the composition of claim 2 and adding said composition to sugar to produce a mixture, said mixture characterized by a sweetness level of a sugar solution containing 10% more sugar than said mixture.

11. The process of claim 10, wherein said composition is prepared by boiling water, adding propylene glycol, sodium chloride and said additive and stirring.

* * * * *